US007536019B2

(12) United States Patent
Putti et al.

(10) Patent No.: US 7,536,019 B2
(45) Date of Patent: May 19, 2009

(54) AUDIO SYSTEM FOR USE WITH A VEHICLE

(75) Inventors: Justin Putti, Rochester Hills, MI (US); David Prince, Villa Park, IL (US); Robert True, Pleasant Prairie, WI (US)

(73) Assignee: Lear Corporation, Southfield, MI (US)

( * ) Notice: Subject to any disclaimer, the term of this patent is extended or adjusted under 35 U.S.C. 154(b) by 1009 days.

(21) Appl. No.: 10/745,347

(22) Filed: Dec. 22, 2003

(65) Prior Publication Data

US 2005/0135636 A1 Jun. 23, 2005

(51) Int. Cl.
*H04B 1/00* (2006.01)

(52) U.S. Cl. ............................................ 381/86; 381/2

(58) Field of Classification Search .................. 381/86, 381/2, 336, 302, 300, 389, 17–27, 98–99, 381/123, 1

See application file for complete search history.

(56) References Cited

U.S. PATENT DOCUMENTS 2,137,032 A * 11/1938 Snow ......................... 381/304
4,596,034 A 6/1986 Moncrieff
4,703,502 A * 10/1987 Kasai et al. ................. 381/302
4,723,289 A 2/1988 Schreiber et al.
5,068,897 A * 11/1991 Yamato et al. .............. 381/302
5,129,004 A * 7/1992 Imai et al. ..................... 381/86
5,874,695 A 2/1999 Tracy
5,883,961 A 3/1999 House et al.
5,979,590 A 11/1999 Telmos
6,120,091 A 9/2000 Reich et al.
6,279,678 B1 8/2001 Tracy
6,375,778 B1 4/2002 Cremades Schulz et al.
6,555,042 B1 4/2003 Mola et al.
2003/0021433 A1* 1/2003 Lee ............................ 381/302
2003/0103634 A1* 6/2003 Ito .............................. 381/86
2004/0125967 A1* 7/2004 Eid et al. ...................... 381/99

* cited by examiner

*Primary Examiner*—Vivian Chin
*Assistant Examiner*—Lun-See Lao
(74) *Attorney, Agent, or Firm*—Brooks Kushman P.C.

(57) ABSTRACT

An audio system for use in a passenger compartment of a vehicle. The system includes a front-driver side speaker unit and a front-passenger side speaker unit to cooperatively emit audio sound to the passenger compartment. The driver-side speaker unit includes a primary speaker and a secondary speaker to produce sound in cooperation with a primary speaker and a secondary speaker of the passenger-side speaker unit. An audio control system is configured to compensate for unbalancing of stereo images at front-driver/passenger positions by controlling output from the secondary speakers based on output from the primary speakers.

18 Claims, 1 Drawing Sheet

AUDIO SYSTEM FOR USE WITH A VEHICLE

BACKGROUND OF THE INVENTION

1. Field of the Invention

The present invention relates to an audio system for a vehicle having a plurality of speaker units which cooperatively generate sound for a vehicle passenger compartment.

2. Background Art

Audio systems are provided in vehicle passenger compartments to generate sound for passengers. Some audio systems include a pair of speaker units positioned relative to a front-driver position and a front-passenger position in the vehicle passenger compartment.

It is desirable that the audio signals heard by passengers in either position be balanced as if the passenger was positioned equidistant from each speaker. The proper balancing of the audio signals is referred to as a stereo image. A balanced stereo image allows a person in either position to hear sound which appears to be originating equally from the front-driver side and front-passenger side speaker units.

Many vehicle audio systems produce an unbalanced stereo image. An unbalanced stereo image causes the passenger to perceive sound generated by the audio system to be localized to one side of the vehicle. Typically, this was a result of the differential positioning of the speaker units relative to passenger position in the vehicle.

For example, the front-driver side speaker unit is positioned much closer to the front-driver position than the front-passenger position. As such, the audio sounds originating from the front-driver side speaker unit will arrive at the front-driver position prior to the audio sounds originating from the front-passenger speaker unit.

The unbalancing of the stereo image causes the driver to hear more sound from the front-driver speaker unit than the front-passenger speaker unit due to differential timing or magnitude of the sounds received from each speaker.

The unbalanced sound, which is commonly referred to as near-side localization, is a problem that disrupts stereo imaging at both the front-driver and passenger positions. Accordingly, there exists a need to provide an audio system for a vehicle which provides a balanced stereo image to both the front-driver and passenger positions.

SUMMARY OF THE INVENTION

It is, therefore, an object of the present invention to provide balanced sound to front-driver and front-passenger positions.

One aspect of the present invention relates to an audio system for use in a passenger compartment of a vehicle. The audio system includes a driver-side speaker unit disposed proximate a front-driver position and a passenger-side speaker unit disposed proximate a front-passenger position. Each speaker unit includes a primary speaker and a secondary speaker. An audio control system communicates with the driver-side and passenger-side speaker units to compensate for unbalancing of stereo images generated by the speaker units. This compensation includes controlling output from the secondary speakers based on output generated by the primary speakers.

One aspect of the present invention relates to an audio system for use in a passenger compartment of a vehicle to generate a stereo image. The system includes a driver-side speaker unit disposed proximate the front-driver position and having a primary speaker with a directivity towards a front-passenger position and a secondary speaker with rearward directivity. The system also includes a passenger-side speaker unit disposed proximate a front-passenger position and having a primary speaker with directivity towards the front-driver position and a secondary speaker with rearward directivity. An audio control system is in communication with the driver-side and passenger-side speaker units to provide stereo images at the front-driver and front-passenger positions. In particular, the stereo images can be provided during speaker output frequencies above a predefined unbalancing frequency which corresponds with a directivity of the primary speakers being insufficient to balance the stereo images without compensation from the secondary speakers.

One aspect of the present invention relates to method for controlling an audio system for use in a passenger compartment of a vehicle. The method includes controlling the system to control a driver-side speaker unit disposed proximate a front-driver position and having a primary speaker and a secondary speaker. The method also includes controlling a passenger-side speaker unit disposed proximate a front-passenger position and having a primary speaker and a secondary speaker. The method controls the speaker units to provide a stereo image at the front-driver and front-passenger positions during speaker output frequencies above a predefined unbalancing frequency. The unbalancing frequency corresponds with the directivity of speakers causing an unbalancing of the stereo images. This unbalancing in controlled by balancing output from the secondary driver-side speaker with output from the primary passenger-side speaker and balancing output from the secondary passenger-side speaker with output from the primary driver-side speaker.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
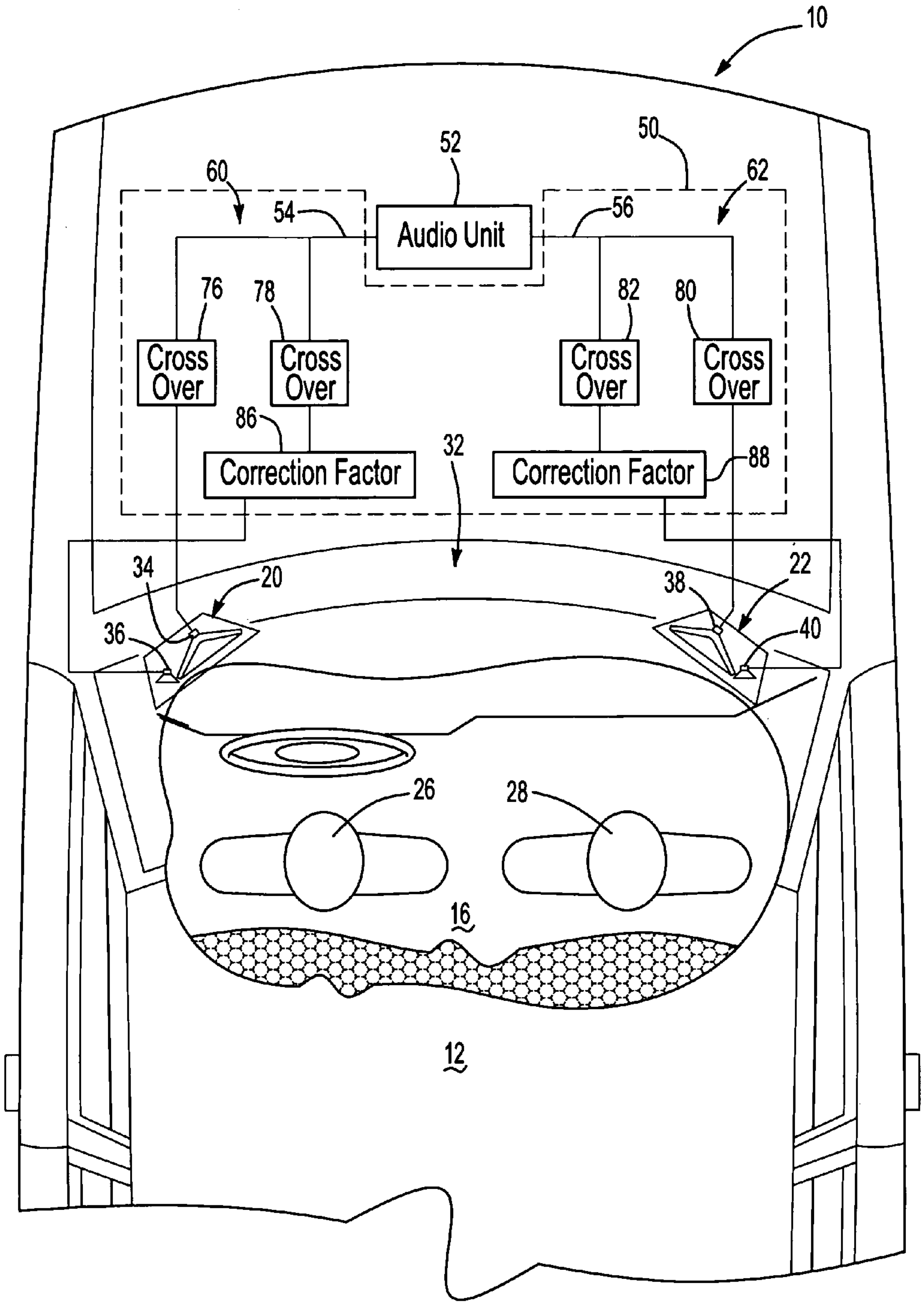
FIG. 1 illustrates an audio system for generating a balanced stereo image in a passenger compartment of a vehicle in accordance with the present invention.

FIG. 1 illustrates an audio system 10 in a passenger compartment of an automotive vehicle 12 in accordance with the present invention. It is understood that audio system 10 is not limited for use to automobiles and is operative with any vehicle having a need to provide a stereo image to a passenger compartment.

Audio system 10 is particularly suited to provide stereo images to multiple locations within passenger compartment 16 of vehicle 12. The audio system 10 includes a driver-side speaker unit 20 and passenger-side speaker unit 22. First speaker unit 20 is proximate front-driver position 26 while second speaker unit 22 is disposed proximate front-passenger position 28. Speaker units 20, 22 are oriented in dash 32, as shown, but could similarly be positioned on opposing surfaces in other areas of passenger compartment 16 of vehicle 12, such as the sill, a-pillar, door or headliner.

A stereo image is produced by the first and second speaker units 20, 22 of system 10. The stereo image can be balanced for both front-driver position 26 and front-passenger position 28 by a central unit 30. In this manner, a listener in either position 26, 28 hears output as if the listener were positioned equidistant from speaker units 20, 22.

Each speaker unit 20, 22 includes a primary speaker 34, 38 and a secondary speaker 36, 40 respectively. Left channel output is provided by primary speaker 34 and secondary speaker 36 of driver-side speaker unit 20. Right channel output is provided by primary speaker 38 and secondary speaker 40 of passenger-side speaker unit 22.

Primary speakers 34, 38 are directed in a cross-car fashion to deliver the right and left channel output to passenger compartment 16. The positioning of primary speakers 34, 38 in a cross-car fashion is particular suited to generating a stereo image for both the front-driver and passenger positions 26, 28.

The directivity (radiation pattern) of sound generated by each speaker unit 20, 22 increases with sound frequency. The severity of the increase depends on the physical configuration of the speaker particularly the cone size of the speaker. Primary speakers 34, 38 generally provide the stereo image for front-driver and passenger positions 26, 28 at lower sound frequencies.

An increase in sound frequencies may cause the stereo image generated by primary speakers 34, 38 to become unbalanced. The unbalancing stereo image causes the listener to perceive sound to be localized toward one of the speaker units 20, 22. Secondary speakers 36, 40 compensate for the directivity deficiencies of primary speakers 34, 38 at frequencies above the unbalanced frequency. Secondary speakers 36, 40 correspond with the left and right channel sounds and point in a substantially rearward or rear-car direction with respect to the front-driver and passenger positions 26, 28.

For example, primary speaker 34 tends to provide sufficient left channel sound to driver position 26 at frequencies below the unbalancing frequency. The increasing directivity of primary speaker 34 reaches a threshold at the unbalancing frequency, causing a substantial portion of the left channel sound from the primary speaker 34 to bypass the front-driver position 26.

The secondary speaker 36 compensates for the bypass by providing high directivity toward the front-driver position 26. In this manner, output from secondary speaker 36 is localized to the front-driver position 26, leaving front-passenger position 28 relatively unaffected. Front-passenger position 28 receives sufficient left channel output due to the increase in directivity from the primary speaker 34.

Audio system 10 further includes a control unit 50 to manage the output of speakers 34, 36, 38, 40. Control unit 50 receives signals from media unit 52. Media unit 52 can be any audio signal producing device, such as a radio, CD player, tape player, video player, or other media player. Preferably, audio unit 52 outputs left channel signals 54 and right channel signals 56 to control unit 50 at left control portion 60 and right control portion 62 respectively. Left control portion 60 corresponds with first speaker unit 20 and right control portion 62 corresponds with second speaker unit 22.

Cross-overs 76, 78, 80, 82 are provided to filter signals delivered to speakers 34, 36, 38, 40. Primary cross-overs 76, 80 set low frequency threshold for primary speakers 34, 38. Secondary cross-overs 78, 82 set low frequency threshold for secondary speakers. The speakers are inactive at frequencies below their respective low frequency thresholds.

Preferably, secondary cross-overs 78, 82 are set a frequency greater than or equal to the unbalanced frequency. Primary cross-overs 76, 80 are preferably set at a frequency less than the unbalanced frequency. In this manner, secondary speakers 36, 40 are inactive at frequencies below the unbalanced frequency when they are unnecessary for operation.

Secondary speakers 36, 40 become active at frequencies at or above the established unbalanced frequency of secondary cross-overs 78, 82. Output from secondary speakers 36, 40 supplements output from primary speakers 34, 38. The output from secondary speakers 36, 40 is used to compensate for increasing directivity of primary speakers 34, 38 to balance the stereo image.

Control unit 50 applies a correction factor 86, 88 to the directivity of secondary speakers 36, 40. The correction factors 86, 88 balance output of secondary speakers 36, 40 with output from the related primary speaker 34, 38 to correct the stereo images at both front-driver and passenger positions 26, 28.

Secondary speaker 36 is controlled by control unit 50 to balance increased directivity output from primary speaker 38 at frequencies above the unbalanced frequency. Likewise, secondary speaker 40 is controlled to balance increased directivity output from primary speaker 34 at frequencies above the unbalanced frequency causes.

In this manner, secondary speakers 36, 40 compensate for primary speakers 34, 38 when passenger positions 26, 28 are bypassed by the increased directivity of the respective near-side primary speaker 34, 38. The compensation allows the stereo image to be maintained at positions 26, 28 at frequencies above the primary speaker unbalanced frequency.

The correction factors 86, 88 may be a time-delay, an amplitude level decrease, or a combination of both. The correction factors 86, 88 are based on the Rayleigh theory of "duplex" localization to describe how one of two hearing mechanisms may be used to localize sound. For frequencies lower than 1500 Hz (defined by the distance between a listener's ears), a human brain uses the timing differences between the arrival of sound to establish direction. For frequencies above 1500 Hz, the brain uses the level difference between sound arriving at the two ears where the closer ear hears a higher sound level. These Interaural Time Differences and Interaural Level Differences are used alone or in combination to establish a direction of sound for which time-delay, amplitude level decrease, or combination of both are used to control compensation by secondary speakers 36, 40.

With respect to time-delay, output from secondary passenger-side speaker 40 can be delayed to arrive proximate in time with output from the primary driver-side speaker 34 at the front-passenger position 28. This provides a stereo image at front-passenger position 28. Likewise, output from secondary driver-side speaker 36 can be delayed to arrive proximate in time with output from primary passenger-side speaker 38 at front-driver position 26. This provides a stereo image at front-driver position 26.

With respect to amplitude level decrease, output from secondary passenger-side speaker 40 can be lowered to a level less than output from primary driver-side speaker 34 for balancing perception of the stereo image at front-passenger position 28. This provides a stereo image at front-passenger position 28. Likewise, output from secondary driver-side speaker 36 can be lowered to a level less than output from primary passenger-side speaker 38 for balancing perception of stereo image at front-passenger position 26. This provides a stereo image at front-driver position 26.

While embodiments of the invention have been illustrated and described, it is not intended that these embodiments illustrate and describe all possible forms of the invention. In particular, audio control unit can comprise other configurations and include other structures for receiving audio signals and delivering the audio signals to the speaker units. Audio control unit may even be integrated with speaker units. The words used in the specification are words of description rather than limitation, and it is understood that various changes may be made without departing from the spirit and scope of the invention.

What is claimed is:

1. An audio system for use in a passenger compartment of a vehicle, the audio system comprising:

a driver-side speaker unit disposable proximate a front-driver position, the unit having a primary speaker and a secondary speaker;

a passenger-side speaker unit disposable proximate a front-passenger position, the unit having a primary speaker and a secondary speaker;

a controller in communication with the driver-side and passenger-side speaker units, the controller configured to compensate for unbalanced stereo images generated by the speaker units at the front-driver and front-passenger positions by controlling output from the secondary speakers based on output generated by the primary speakers; and wherein the secondary speakers are prevented from activating until an output frequency of the primary speakers is above a predefined unbalancing frequency which corresponds with directivity of the primary speakers unbalance the stereo images.

2. The system of claim 1 wherein the controller is configured for (i) controlling unbalancing of the stereo image at the front-driver position by balancing output from the secondary driver-side speaker with output from the primary passenger-side speaker and (ii) controlling unbalancing of the stereo image at the front-passenger position by balancing output from the secondary passenger-side speaker with output from the primary driver-side speaker.

3. The system of claim 1 wherein the controller applies a correction factor to audio signals being communicated to the secondary speakers to balance output from the secondary passenger-side speaker with output from the primary driver-side speaker and to balance output from the secondary driver-side speaker with output from the primary passenger-side speaker.

4. The system of claim 3 wherein the correction factor causes a time delay such that output from the secondary passenger-side speaker arrives proximate in time with output from the primary driver-side speaker at the front-passenger position and output from the secondary driver-side speaker arrives proximate in time with output from the primary passenger-side speaker at the front-driver position.

5. The system of claim 3 wherein the correction factor decreases an output level of the secondary speakers such that output from the secondary passenger-side speaker is at a lower level than output from the primary driver-side speaker for balancing perception of the stereo image at the front-driver position and output from the secondary driver-side speaker is at a lower level than output from the primary passenger-side speaker for balancing perception of the stereo image at the front-passenger position.

6. The system of claim 3 wherein the correction factor delays and decreases output level of the secondary speakers relative to the primary speakers to balance the stereo image at the front-driver and front-passenger positions.

7. The system of claim 1 wherein the controller includes cross-overs for the primary speakers at a frequency less than the predefined unbalancing frequency and cross-overs for the secondary speakers at a frequency greater than or equal to the unbalancing frequency such that the secondary speakers are not used to balance the stereo image unless output from the speakers are at frequencies above a predefined frequency threshold.

8. The system of claim 7 wherein the unbalancing frequency is 1500 Hz and the secondary speaker cross-overs are set at a frequency of 1500 Hz.

9. The system of claim 1 wherein the primary speakers have a substantially cross-car directivity and the secondary speakers have a substantially rear-car directivity.

10. The system of claim 1 wherein the speaker units are disposed in a dashboard of the vehicle.

11. The system of claim 1 wherein the speaker units are disposed in opposing doors of the vehicle.

12. The system of claim 1 wherein the speaker units are disposed in opposing A-pillars of the vehicle.

13. An audio system for use in a passenger compartment of a vehicle to generate a stereo image, the system comprising:

a left channel driver-side speaker unit disposed proximate a front-driver position that only provides left channel audio, the unit having a primary speaker with a directivity towards a front-passenger position and a secondary speaker with rearward directivity;

a right channel passenger-side speaker unit disposed proximate a front-passenger that only provides right channel audio, the unit position having a primary speaker with directivity towards the front-driver position and a secondary speaker with rearward directivity;

a controller in communication with the driver-side and passenger-side speaker units, the controller configured to provide stereo images at the front-driver and front-passenger positions during speaker output frequencies above a predefined unbalancing frequency which corresponds with the directivity of the primary speakers being insufficient to balance the stereo images without compensation from the directivity of secondary speakers;

wherein the controller provides the stereo images by (i) controlling unbalancing of the stereo image at the front-driver position at frequencies above the unbalancing frequency by balancing output from the secondary driver-side speaker with output from the primary passenger-side speaker and (ii) controlling unbalancing of the stereo image at the front-passenger position at frequencies above the unbalancing frequency by balancing output from the secondary passenger-side speaker with output from the primary driver-side speaker;

wherein the right channel passenger-side speaker unit and left channel driver-side speaker unit are the only left and right channel speaker units proximate a dashboard of the vehicle; and wherein the secondary speakers are prevented from activating until an output frequency of the primary speakers is above the unbalancing frequency.

14. A method for controlling an audio system for use in a passenger compartment of a vehicle, the method comprising:

controlling a driver-side speaker unit disposed proximate a front-driver position having a primary speaker and a secondary speaker and a passenger-side speaker unit disposed proximate a front-passenger position having a primary speaker and a secondary speaker, wherein controlling includes providing stereo images at the front-driver and front-passenger positions during speaker output frequencies above a predefined unbalancing frequency which corresponds with directivity of the speakers unbalancing the stereo images by balancing output from the secondary driver-side speaker with output from the primary passenger-side speaker and balancing output from the secondary passenger-side speaker with output from the primary driver-side speaker; and preventing activation of the secondary speakers until the primary speaker output frequencies are above the predefined unbalancing frequency.

15. The method of claim 14 further comprising controlling a cross-over included for each speaker to prevent the secondary speakers from balancing the stereo image unless output from the speakers are at frequencies above the predefined frequency threshold.

16. The method of claim 15 further comprising operating the cross-overs for the primary speakers are at a frequency less than the unbalancing frequency and operating the cross-overs for the secondary speakers are at a frequency greater than or equal to the unbalancing frequency.

17. The method of claim 14 further comprising applying a time delay to output of the secondary speakers such that output from the secondary speakers arrive proximate in time with output of the primary speakers.

18. The method of claim 14 further comprising decreasing an output level of the secondary speakers such that output from the secondary speakers is at a lower level than output from the primary speakers in order to balance perception of the stereo image at the front-driver and the front-passenger positions.

* * * * *